US007965176B2

(12) United States Patent
Kuboyama

(10) Patent No.: US 7,965,176 B2

(45) Date of Patent: Jun. 21, 2011

(54) REMOTE CONTROL SYSTEM

(75) Inventor: Hideo Kuboyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 960 days.

(21) Appl. No.: 11/758,808

(22) Filed: Jun. 6, 2007

(65) Prior Publication Data

US 2007/0290883 A1 Dec. 20, 2007

(30) Foreign Application Priority Data

Jun. 9, 2006 (JP) ................................. 2006-161646

(51) Int. Cl.
*B60R 25/10* (2006.01)

(52) U.S. Cl. .............. 340/426.13; 340/825.71; 340/5.64

(58) Field of Classification Search ............... 340/572.1, 340/825.72, 825.69, 825.71, 5.64, 426.13; 455/41.2, 550, 511; 367/197, 198, 199; 370/493, 370/495
See application file for complete search history.

(56) References Cited

U.S. PATENT DOCUMENTS 3,836,974 A * 9/1974 Wells ............................ 370/314
4,131,849 A * 12/1978 Freeburg et al. .............. 375/216
4,495,647 A * 1/1985 Burke et al. ................. 340/7.57
4,780,715 A * 10/1988 Kasugai ........................ 340/3.51
5,153,579 A * 10/1992 Fisch et al. ............... 340/825.22
5,646,606 A * 7/1997 Wilson et al. ............ 340/825.37
6,317,045 B1 * 11/2001 Suzuki .......................... 340/571
6,407,779 B1 * 6/2002 Herz ............................ 348/734
6,466,801 B2 * 10/2002 Leyendecker ............. 455/550.1
6,629,077 B1 * 9/2003 Arling et al. .................. 704/275
6,930,994 B1 * 8/2005 Stubbs .......................... 370/348
6,987,462 B2 * 1/2006 Bae et al. ................. 340/825.72
2002/0017992 A1 * 2/2002 Hidaka et al. .............. 340/572.1

FOREIGN PATENT DOCUMENTS

JP 63-245096 10/1988
JP 63-245096 A 10/1988

OTHER PUBLICATIONS

Y. Nakatoh, et al., Studies on Practical Use of Voice Recognition Techniques for Home Information Appliances, 2004 Spring Meeting of the Acoustic Society of Japan 1-8-12, Mar. 2004 pp. 27-30 (Partial English Translation).

* cited by examiner

*Primary Examiner* — Daniel Wu
*Assistant Examiner* — Rufus Point
(74) *Attorney, Agent, or Firm* — Canon U.S.A., Inc. I.P. Division

(57) ABSTRACT

A remote controller includes a microphone, a data transmitter which transmits data corresponding to a button, and a voice transmitter which transmits voice input acquired from the microphone. The voice transmitter transmits voice based on the press of a predetermined button, and the data transmitter transmits data. An electronic device includes a voice receiver, data receiver, and processor. The processor acquires data from the data receiver. The processor determines based on data whether the voice receiver has received voice, and acquires the voice.

5 Claims, 5 Drawing Sheets

REMOTE CONTROL SYSTEM

BACKGROUND OF THE INVENTION

1. Field of the Invention

The present invention relates to an electronic device and a remote control system having a remote controller for remotely operating the electronic device.

2. Description of the Related Art

A remote control system which operates a device from a remote place by infrared or wireless communication is widely used in various devices such as TV sets and air conditioners. A general remote control system transmits data corresponding to a pressed button of a remote controller by infrared rays or the like and causes an electronic device which receives the data to execute processing corresponding to the data.

Recently, studies have been made to send voice input to a remote controller as well as data corresponding to a button. Japanese Patent Laid-Open No. 63-245096 discloses a technique of transmitting voice input through a microphone provided for a remote controller upon modulating the voice on a carrier wave such as a radio wave or an ultrasonic wave, and causing an electronic device to receive and process the voice. In addition, "Studies on Practical Use of Voice Recognition Techniques for Home Information Appliances", 2004 Spring Meeting of the Acoustic Society of Japan 1-8-12 discloses a technique of transmitting voice input through a microphone upon frequency modulation of the voice with infrared rays and causing an electronic device to receive and process the voice.

FIG. 4 is a block diagram of a conventional remote control system configured to transmit voice from a remote controller to an electronic device.

Referring to FIG. 4, reference numeral 401 denotes a remote controller which receives and transmits voice; 402, an electronic device which receives voice and performs predetermined processing for it; 403, a microphone which receives voice in the remote controller 401; 404, a voice transmitter which transmits voice upon modulating it with infrared rays in the remote controller 401; 405, a voice transmission button which issues a voice transmission instruction; 406, an infrared voice carrier which carries voice; 407, a voice receiver which receives the infrared voice carrier 406 in the electronic device 402; and 408, a processor which acquires voice by detecting the reception signal received by the voice receiver 407 and performs predetermined processing for it.

The remote controller 401 receives voice from the microphone 403 only for the period during which the user presses the voice transmission button 405 of the remote controller 401, and causes the voice transmitter 404 to transmit the voice to the infrared voice carrier 406 upon modulating the voice. In the electronic device 402, the voice receiver 407 receives the infrared voice carrier 406 and demodulates it into a voice signal, and the processor 408 acquires the voice signal and executes predetermined processing.

The electronic device 402 in the above remote control system needs to detect the start and end of voice to allow the processor 408 to acquire the voice. It is conceivable to use one of the following three methods as this method.

The first method is to make the voice receiver 407 notify the processor 408 of the start and end of reception of an infrared voice carrier.

The second method is to add start information and data size information to a voice signal and determine the start and end of voice by making the processor 408 read the start information and data size information.

If, however, the voice receiver 407 is an existing module and does not have a function of outputting voice received through an analog signal transmission path such as a LINE output, it is impossible to use the first and second methods. More specifically, in this case, since the voice receiver 407 does not have a function of detecting the start and end of reception of an infrared ray and transmitting it to the processor 408, it is impossible to implement the first method. According to the second method, if voice is digital data, it is easy to add start information and data size information as digital data to voice data and read them. It is, however, difficult to add start information and data size information to an analog voice signal or read the information.

The third method is to make the processor 408 always acquire a voice signal through a LINE input and determine the start and end of the voice based on a feature such as the power value of the voice signal. When, however, a very low voice close to silence is transmitted, this method may erroneously determine that there is no voice or, when no voice is transmitted, may erroneously determine that voice is input, due to device noise on the transmission path. In order to unfailingly transmit voice input from the microphone 403, including silence, to the processor, it is impossible to use this method.

It is therefore necessary to use another method which allows the processor 408, which acquires an analog voice signal from the LINE input, to determine the start and end of voice.

SUMMARY OF THE INVENTION

According to one aspect of the present invention, a remote control system including an electronic device and a remote controller for remotely operating the electronic device is provided. The remote controller includes a voice input unit configured to input voice, a voice transmission unit configured to transmit voice input from the voice input unit to the electronic device during an interval from occurrence of a voice input start event to occurrence of a voice input end event, and a data transmission unit configured to transmit data indicating the occurrence of the voice input start event and the occurrence of the voice input end event to the electronic device in synchronism with transmission of voice by the voice transmission unit. The electronic device includes a data reception unit configured to receive data transmitted by the data transmission unit, a voice reception unit configured to receive voice transmitted by the voice transmission unit during an interval from when the data received from the data reception unit indicates occurrence of the voice input start event to when the data indicates occurrence of the voice input end event, and a processing unit configured to execute processing corresponding to data received from the data reception unit and voice received from the voice reception unit.

Further features of the present invention will become apparent from the following description of exemplary embodiments with reference to the attached drawings.

DESCRIPTION OF THE EMBODIMENTS

Various exemplary embodiments, features, and aspects of the present invention will be described in detail below with reference to the drawings.

Figure 1:
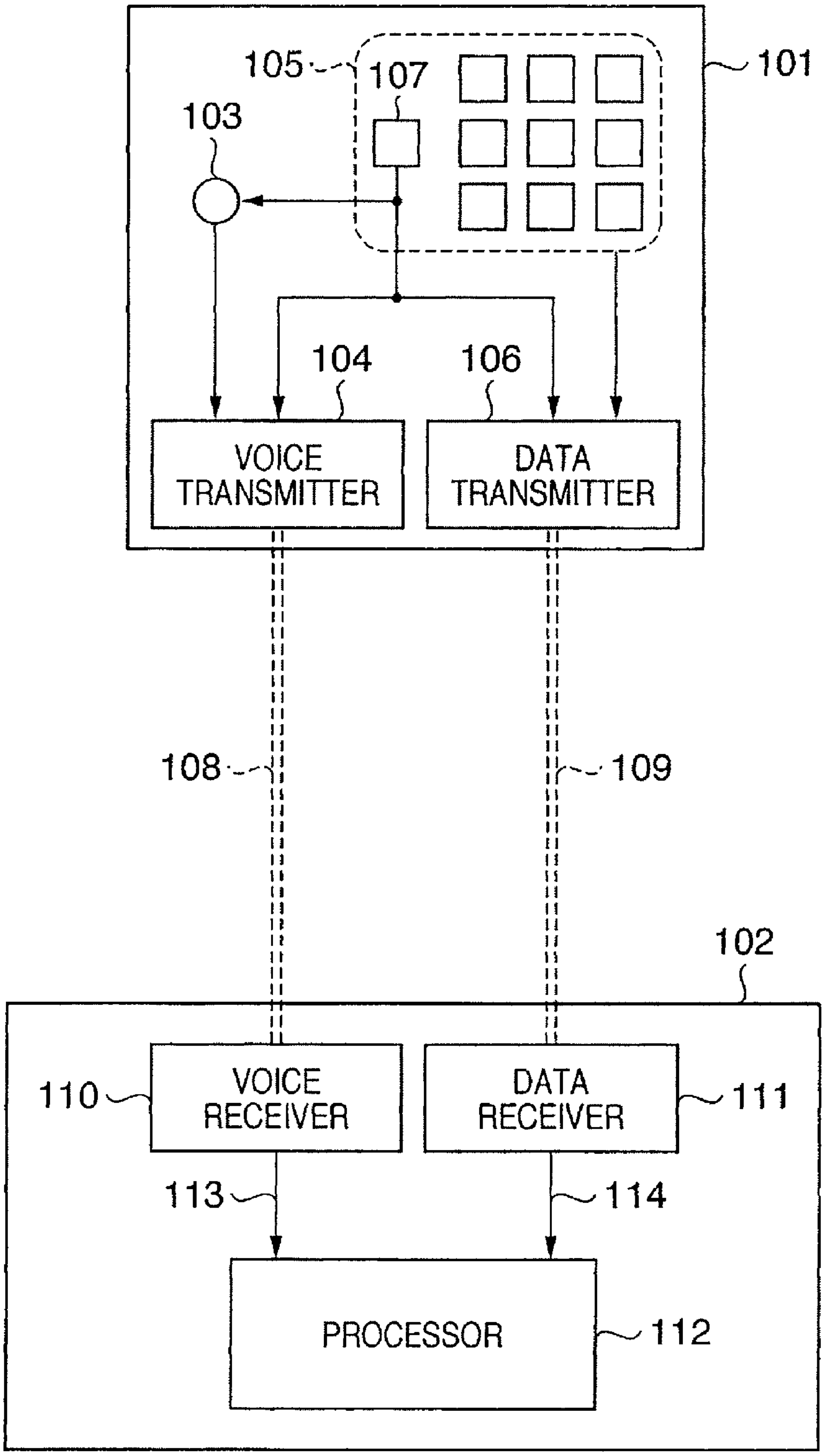
FIG. 1 is a block diagram showing the functional arrangement of a remote control system according to an embodiment.

FIG. 1 is a block diagram showing a remote control system according to this embodiment.

Referring to FIG. 1, reference numeral 101 denotes a remote controller for remotely operating an electronic device 102. The operation of the electronic device 102 is controlled based on a signal received from the remote controller 101. A TV set is a typical example of the electronic device. In the remote controller 101, reference numeral 103 denotes a microphone which receives a voice input; 104, a voice transmitter which modulates the voice input from the microphone 103 into an infrared ray and transmits it; 105, an operation unit which has a plurality of buttons to be operated by the user; 106, a data transmitter which transmits data corresponding to a pressed button by an infrared ray; and 107, a voice transmission button which is placed on the operation unit 105 and is operated to issue a voice transmission instruction.

Reference numeral 108 denotes an infrared voice carrier which carries the voice output from the voice transmitter 104; and 109, an infrared data carrier which carries the data output from the data transmitter 106.

In the electronic device 102, reference numeral 110 denotes a voice receiver which receives the infrared voice carrier 108; 111, a data receiver which receives the infrared data carrier 109; and 112, a processor which acquires the data received by the data receiver 111 and the voice received by the voice receiver 110 and performs predetermined processing. The predetermined processing includes, for example, the processing of recording/playing back acquired voice, and the processing of performing voice recognition with respect to acquired voice, converting the recognition result into control data, and controlling the electronic device 102. Reference numeral 113 denotes a voice transmission path which transmits voice from the voice receiver 110 to the processor 112. As the voice transmission path 113, for example, a LINE cable is used, through which voice is transmitted in an analog form. Reference numeral 114 denotes a data transmission path which transmits data from the data receiver 111 to the processor 112. As this data transmission path, for example, a serial cable is used.

The operation of the remote control system according to this embodiment will be described next.

In the remote controller 101, when the user presses a button of the operation unit 105 (excluding the voice transmission button 107), the data transmitter 106 transmits data corresponding to the button by carrying it on the infrared data carrier 109. In the electronic device 102, the data receiver 111 receives the infrared data carrier and extracts data, and transmits it to the data transmission path 114. The data transmission path 114 is a digital data transmission path such as a serial transmission path. The processor 112 can detect whether any data flows through the data transmission path 114. Upon acquisition of data, the processor 112 executes processing corresponding to the data. Assume that the electronic device 102 is a TV set. In this case, if the above data represents channel change control, the processor controls the TV set, which is the electronic device, to change the current channel to the channel indicated by the data.

In the remote controller 101, when the user presses the voice transmission button 107 of the operation unit 105, the voice transmitter 104 modulates voice input from the microphone 103 and transmits the resultant data to the infrared voice carrier 108. At this time, the data transmitter 106 transmits data X representing the press of the voice transmission button 107 (i.e., the occurrence of a voice input start event) by the infrared data carrier 109. In this embodiment, while the user presses the voice transmission button 107, the voice transmitter 104 receives a voice input from the microphone 103, modulates it, and transmits the resultant data to the infrared voice carrier 108. When the user releases the voice transmission button 107 afterward, the input of voice from the microphone 103 and the transmission of an infrared voice carrier are stopped. At this time, the data transmitter 106 transmits data Y representing the release of the voice transmission button 107 (i.e., the occurrence of a voice input end event) by the infrared data carrier 109.

In the electronic device 102, the voice receiver 110 receives the infrared voice carrier 108 and transmits the voice to the voice transmission path 113. The processor 112 determines based on the data transmitted from the voice transmission path 113 whether a voice input is transmitted to the voice transmission path 113.

Figure 2:
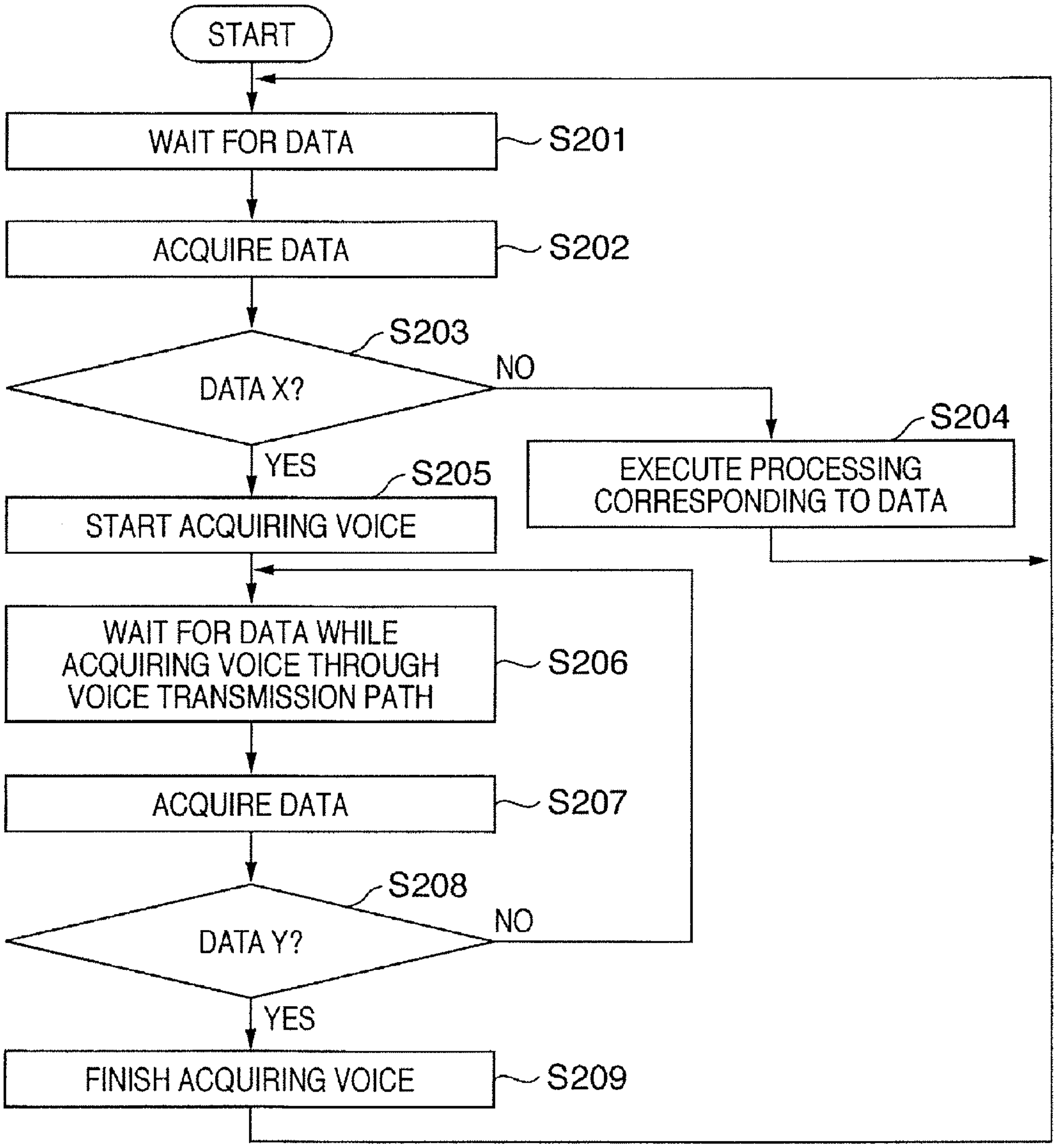
FIG. 2 is a flowchart showing the operation of the processor of an electronic device according to this embodiment.

FIG. 2 shows the operation flowchart of the processor 112 in the electronic device 102.

First of all, in step S201, the electronic device 102 enters a standby state to wait for data. In the standby state, the processor 112 always monitors the data transmission path 114. As soon as data is transmitted, the processor 112 can acquire the data in step S202. Upon acquisition of the data in step S202, the processor 112 determines in step S203 whether the acquired data is the data X representing the press of the voice transmission button 107 (a voice input start event). If NO in step S203, the processor 112 executes processing corresponding to the data in step S204. The process then returns to step S201. If YES in step S203, the electronic device 102 starts acquiring voice in step S205.

In step S206, the electronic device 102 waits for data as in step S201 while acquiring voice from the voice transmission path 113. Upon detecting and acquiring data in step S207, the electronic device 102 determines in step S208 whether the acquired data is the data Y representing the release of the voice transmission button 107 (a voice input end event). If NO in step S208, the process returns to step S206 to continue voice acquisition. In this case, the electronic device 102 need not execute any processing corresponding to the data during voice acquisition, or may execute processing as in step S204. If YES in step S208, the electronic device 102 stops voice acquisition in step S209. The flow then returns to step S201.

Figure 3A:
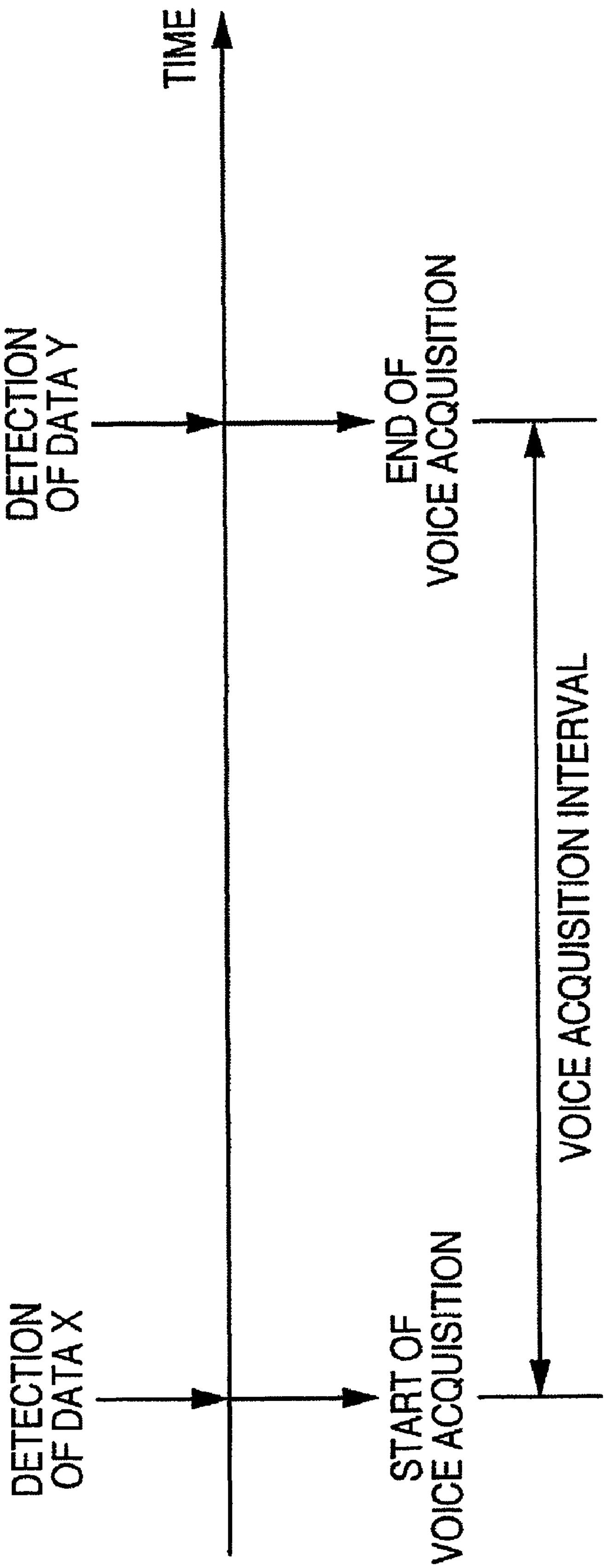
FIG. 3A is a view for explaining voice acquisition processing by the processor in the embodiment.

FIG. 3A is a view showing how the processor 112 acquires data from the data transmission path 114 and acquires voice based on the data. Upon detecting the data X, the processor 112 starts voice acquisition to acquire voice from the voice transmission path 113 until acquisition of the data Y. Upon detecting the data Y, the processor 112 stops voice acquisition.

In the above manner, the remote controller 101 transmits the data X and Y concerning the start and end of voice in synchronism with the transmission of the voice. Acquiring the data X and Y allows the processor 112 of the electronic device 102 to determine whether any voice signal is transmitted from the voice transmission path 113 such as a LINE cable. Note that the processor 112 may execute predetermined processing for an acquired voice signal upon conversion from an analog signal to a digital signal or may execute predetermined processing without converting the analog signal.

Figure 3B:
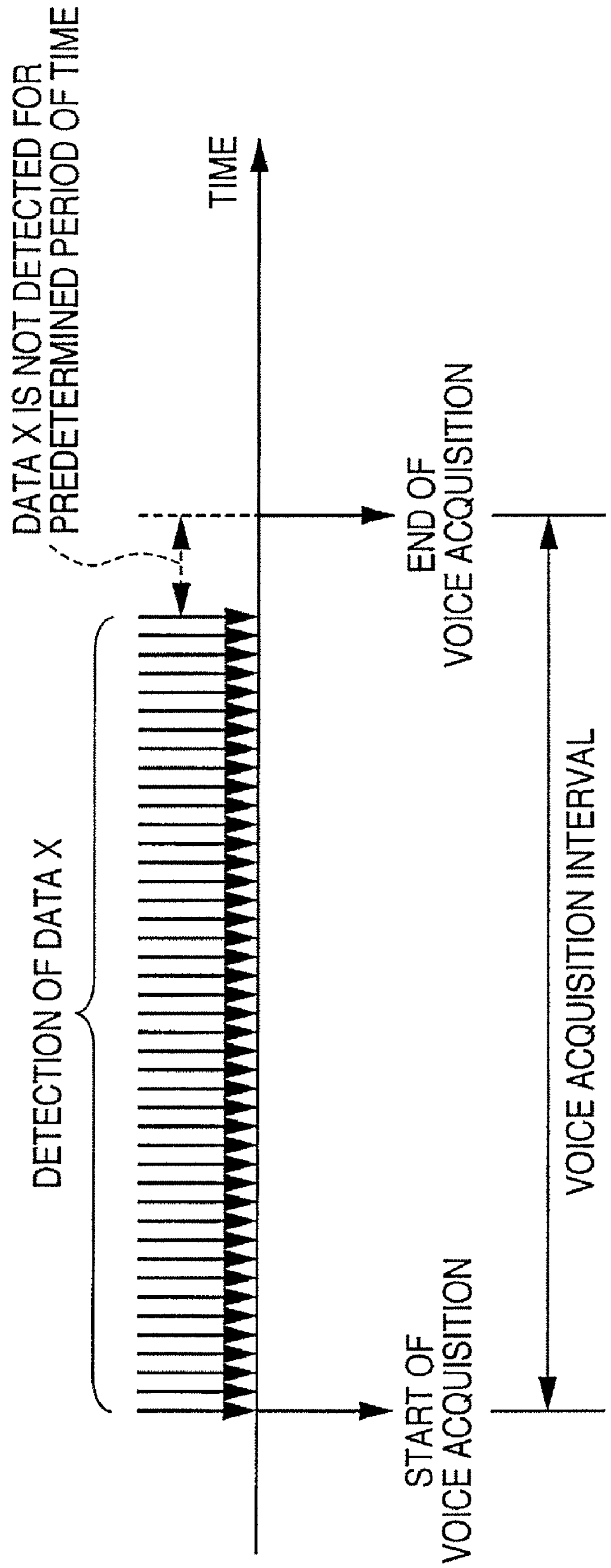
FIG. 3B is a view for explaining voice acquisition processing by the processor in a modification.
Figure 4:
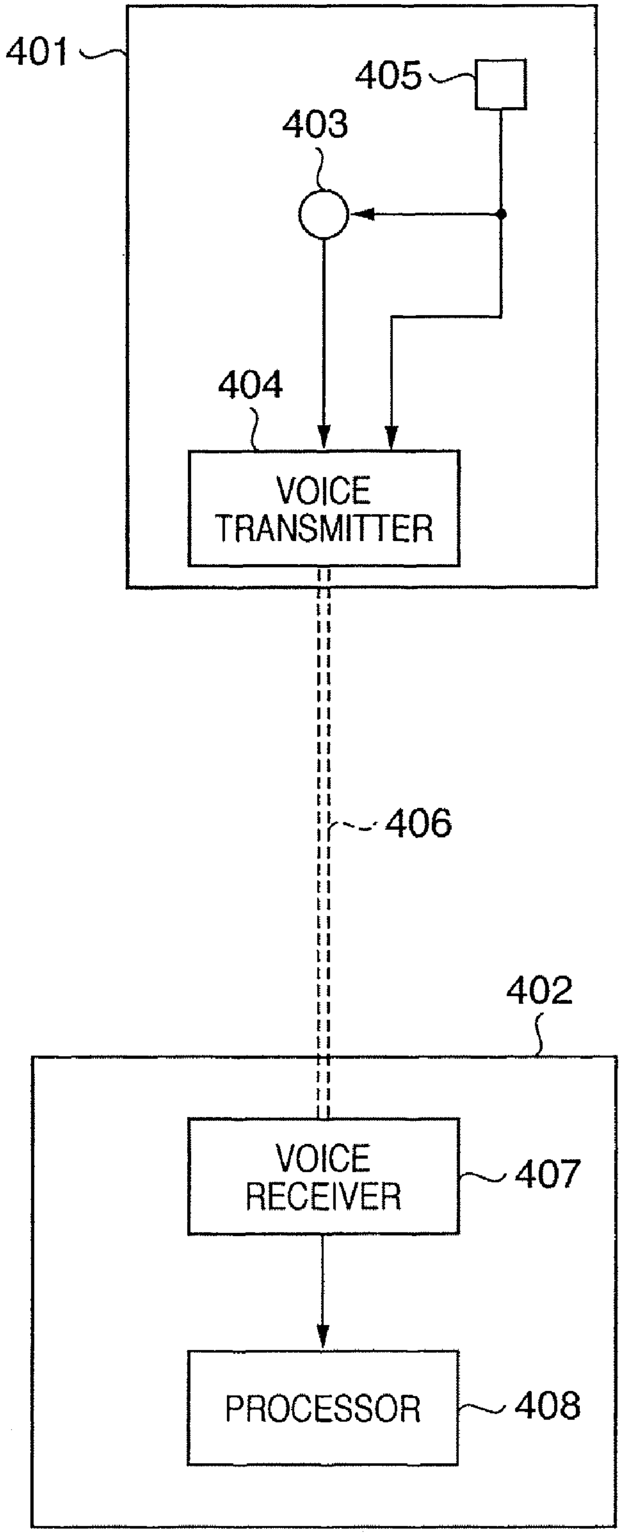
FIG. 4 is a block diagram showing the functional arrangement of a conventional remote control system.

In the above embodiment, as shown in FIGS. 2 and 3A, the data transmitter 106 of the remote controller 101 transmits the data X when the user presses the voice transmission button 107, and transmits the data when the user releases the voice transmission button 107. On the other hand, the processor 112 of the electronic device 102 acquires voice from the voice transmission path 113 during the interval between the acquisition of the data X and the acquisition of the data Y. However, the present invention is not limited to this form. For example, the data transmitter 106 may transmit the data X at predetermined intervals while the user presses the voice transmission button 107. Alternatively, the data transmitter 106 may transmit data Z indicating repetition at predetermined intervals after transmitting the data X once. FIG. 3B shows how the processor 112 acquires voice in a case wherein the data transmitter 106 is configured to repeatedly transmit the data X. Referring to FIG. 3B, upon detecting the data X first, the processor starts acquiring voice from the voice transmission path 113. Subsequently, the processor keeps acquiring voice until detecting the data X at predetermined intervals, and finishes acquiring voice when stopping detection of the data X for a predetermined period.

According to the above embodiment, the voice transmitter 104 and the data transmitter 106 are configured to carry voice and data by infrared communication. However, the present invention is not limited to this, and it is possible to use a communication unit using radio waves or ultrasonic waves instead of infrared rays.

According to this embodiment, since information indicating the start and end of input operation is transmitted to the processor of the electronic device in synchronism with user's voice input operation using the remote controller, the processor can easily determine the start and end of voice acquisition.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-161646, filed Jun. 9, 2006, which is hereby incorporated by reference herein in its entirety.

What is claimed is:

1. A remote control system including an electronic device and a remote controller for remotely operating the electronic device, the remote controller comprising:

an operation button, a voice input unit configured to input voice, a voice transmission unit configured to convert the input voice into an analog signal for transmission and transmit the analog signal to the electronic device via a first transmission channel, and a data transmission unit configured to transmit first digital data indicating a voice input start event to the electronic device via a second transmission channel that is different from the first transmission channel when the operation button is pressed, and transmit second digital data indicating a voice input end event to the electronic device via the second transmission channel when the operation button is released, and the electronic device comprising:

a data reception unit configured to receive the first and second digital data transmitted by said data transmission unit, a voice reception unit configured to receive the analog signal transmitted by said voice transmission unit and convert the analog signal into voice signal, and a processing unit configured to acquire the converted voice signal during an interval from when the first digital data is received to when the second digital data is received by the data reception unit, execute voice recognition for the acquired voice, and execute processing corresponding to the recognized voice.

2. A remote controller for remotely operating an electronic device which executes processing corresponding to input data and/or voice, the remote controller comprising:

an operation button, a voice input unit configured to input voice;

a voice transmission unit configured to convert the input voice into an analog signal for transmission and transmit the analog signal to the electronic device via a first transmission channel; and a data transmission unit configured to transmit first digital data to the electronic device, the first digital data indicating a voice input start event to the electronic device via a second transmission channel that is different from the first transmission channel when the operation button is pressed and transmit second digital data indicating a voice input end event via the second transmission channel when the operation button is released.

3. An electronic device whose operation is controlled by remote operation from a remote controller including an operation button, a voice input unit configured to input voice, a voice transmission unit configured to convert the input voice into an analog signal for transmission and transmit the analog signal to the electronic device via a first transmission channel, and a data transmission unit configured to transmit first digital data indicating a voice input start event to the electronic device via a second transmission channel that is different from the first transmission channel when the operation button is pressed, and transmit second digital data indicating a voice input end event via the second transmission channel when the operation button is released, the electronic device comprising:

a data reception unit configured to receive the first and second digital data transmitted by said data transmission unit;

a voice reception unit configured to receive the analog signal transmitted by said voice transmission unit and convert the analog signal into voice signal; and a processing unit configured to acquire the converted voice signal during an interval from when the first digital data is received to when the second digital data is received by the data reception unit, execute voice recognition for the acquired voice, and execute processing corresponding to the recognized voice.

4. A control method for an electronic device whose operation is controlled by remote operation from a remote controller including an operation button, a voice input unit configured to input voice, a voice transmission unit configured to convert the input voice into an analog signal for transmission and transmit the analog signal to the electronic device via a first transmission channel, and a data transmission unit configured to transmit first digital data indicating the a voice input start event to the electronic device via a second transmission channel that is different from the first transmission channel when the operation button is pressed, and transmit second digital data indicating a voice input end event via the second transmission channel when the operation button is released, the method comprising:

a data reception step of receiving the first and second digital data transmitted by the data transmission unit;

a voice reception step of receiving the analog signal transmitted by the voice transmission unit and converting the analog signal into voice signal; and a processing step of executing processing corresponding to acquiring the converted voice signal during an interval from when the first digital data is received to when the second digital data is received by in the data reception step, executing voice recognition for the acquired voice signal and executing processing corresponding to the recognized voice.

5. A control program stored on a computer-readable medium for controlling an electronic device whose operation is controlled by remote operation from a remote controller including an operation button, a voice input unit configured to input voice, a voice transmission unit configured to convert the input voice into an analog signal for transmission and transmit the analog signal to the electronic device via a first transmission channel, and a data transmission unit configured to transmit first digital data indicating a voice input start event to the electronic device via a second transmission channel that is different from the first transmission channel when the operation button is pressed, and transmit second digital data indicating a voice input end event to the electronic device via the second transmission channel when the operation button is released, the program comprising:

code for a data reception step of receiving the first and second digital data transmitted by the data transmission unit;

code for a voice reception step of receiving the analog signal transmitted by the voice transmission unit and converting the analog signal into voice signal; and code for a processing step of executing processing corresponding to acquiring the converted voice signal during an interval from when the first digital data is received to when the second digital data is received by in the data reception step, executing voice recognition for the acquired voice signal and executing processing corresponding to the recognized voice.

* * * * *